US006567924B1

United States Patent
McGee et al.

(10) Patent No.: US 6,567,924 B1
(45) Date of Patent: May 20, 2003

(54) TECHNIQUE FOR PRACTICALLY MEASURING CYCLE-BY-CYCLE REPEATABLE SYSTEM BEHAVIOR

(75) Inventors: James Ridenour McGee, San Jose, CA (US); John Mark van Gelder, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/545,599

(22) Filed: Apr. 7, 2000

(51) Int. Cl.$^7$ ................................................. G06F 1/14
(52) U.S. Cl. ........................................ 713/502; 702/108
(58) Field of Search ........................... 713/502; 702/108

(56) References Cited

U.S. PATENT DOCUMENTS

| | | | | |
|---|---|---|---|---|
| 4,961,163 A | * | 10/1990 | Bryan et al. | 364/550 |
| 5,202,889 A | * | 4/1993 | Aharon et al. | 371/27 |
| 5,450,349 A | * | 9/1995 | Brown, III et al. | 395/183.03 |
| 5,488,648 A | * | 1/1996 | Womble | 375/13 |
| 5,768,152 A | * | 6/1998 | Battaline et al. | 364/551.01 |
| 5,958,072 A | * | 9/1999 | Jacobs et al. | 714/30 |
| 6,502,116 B1 | * | 12/2002 | Kelly et al. | 708/250 |

* cited by examiner

Primary Examiner—Thomas Lee
Assistant Examiner—Nitin C Patel (57) ABSTRACT

The present invention relates to a system and method for practically measuring cycle by cycle repeatable system behavior. A set of system parameters is selected for tracking by a group of counters which preferably operate to condense the system state trajectory into a manageable set of counter values thereby forming a counter state. Preferably, repeatability of the counter state practically assures repeatability of the system state trajectory. System repeatability is helpful for debugging purposes since definite identification of a system defect is made easier when a test program failure caused by exercising a defect is repeatable. A test program may be varied for successive runs on a computer system by employing a different randomly or pseudo-randomly generated seed for each run and preferably exercising as many features of the computer system as possible in order to search for defects in the computer system. Since it may be difficult to reproduce a failure, once detected, by repeating only a single run of the test program, the inventive mechanism is preferably able to initiate execution of a sequence of test program runs starting at a point many test program runs prior to the occurrence of the error. Once a failure is identified which is at least occasionally repeatable, a trace may be collected to gather detailed information on internal system nodes for successive clock cycles within a timing window in which the failure repeatedly occurs.

20 Claims, 4 Drawing Sheets

TECHNIQUE FOR PRACTICALLY MEASURING CYCLE-BY-CYCLE REPEATABLE SYSTEM BEHAVIOR

BACKGROUND

In the field of computer system testing, it is generally desirable to develop tools for reliably identifying defects in computer systems pertaining to both hardware and software operation. One prior art approach involves generating pseudo-random code to run on the system being tested and comparing emulated results for this test code with results actually obtained on the computer system being tested. Where there is a discrepancy between emulated and actual results, the test program generally flags the existence of a possible defect as a consequence of the discrepancy. However, the discrepancy between the emulated and actual results and any other information collected during the first failure may be insufficient to identify the cause of the suspected defect. More information may need to be collected to narrow the search for the cause of the defect, which can be accomplished only if the test program can repeat the defective behavior. If the defective behavior cannot be repeated, it may be very difficult to determine the cause of the defect.

Generally, a combination of an initial system state and the accumulated effect of a sequence of instructions may operate to exercise a defect. Accordingly, in the prior art, considerable effort is generally expended to carefully recreate the initial system state and to repeat, as precisely as possible the test program stimulus to the system once the initial state is established. This approach is generally both computationally demanding and time consuming.

Generally, once a defect is flagged, traces may be collected employing specialized hardware to determine the cause of the defect. Traces generally involve collecting data pertaining to a number of different system conditions in order to track down the cause of the defect. However, collecting such traces employing a mechanical connection or other hardware arrangement is generally tedious, time consuming, expensive, unreliable, and limited to physically accessible signals.

In the prior art, repeatable system behavior may be determined by comparing the clock cycle by clock cycle behavior within each system component and on each of the system buses connecting the system components within the same timing window in one or more instances of execution of a test program. Where the described clock cycle by clock cycle behavior is identical between the two runs, or instances of test program execution, a determination may be made that there is system repeatability. However, comparing clock cycle by clock cycle behavior for all the system components and buses connecting these components is tedious, computationally expensive, impractical, time consuming, and limited to physically accessible signals. An approach for determining system repeatability is needed which is less demanding.

In the prior art, built-in chip self test has used a technique to condense output vector information. In built-in self-test some means is generally provided to generate a fixed input vector test sequence. A short linear feedback shift register is generally used to calculate a syndrome for the output vector. If the resulting syndrome matches a fixed previously calculated expected syndrome then the chip generally passes the built-in self-test.

Therefore, it is a problem in the art that determining system repeatability by comparing clock cycle by clock cycle behavior for all system components and buses is tedious, time consuming, and impractical.

It is a further problem in the art that to obtain useful information about a defect, an initial system state must generally be carefully duplicated in order to cause the defective behavior to reoccur.

It is a still further problem in the art that recreating an initial system state is difficult and time consuming.

SUMMARY OF THE INVENTION

These and other objects, features, and technical advantages are achieved by a system and method which employs a plurality of counters to represent the system behavior. Preferably, a strategically selected group of operating parameters is tracked by a plurality of counters thereby establishing a counter state to represent the system behavior. Preferably, repeatability of the counter state practically assures repeatability of the system behavior. Preferably, substantial economy of human and computational effort is obtained by condensing system information into a group of carefully selected numerical system parameters which are tracked by a set of counters. The counters may be used to practically measure the degree of system repeatability. In a system with at least occasional system repeatability, the inventive mechanism may be further employed to find defects in system behavior.

In a preferred embodiment, the inventive mechanism repeatedly runs a varying test program on a computer system which operates to compare emulated and actual system results for a series of runs of the varying test program in order to identify program runs in which the emulated and actual system results differ, thereby indicating the existence of a possible defect. Where there is a discrepancy between the emulated and actual program results, the inventive mechanism preferably flags a possible defect and attempts to recreate the failure in order to collect more information about the possible defect. Thus, the inventive mechanism preferably first establishes a mechanism for practically assuring that a set of counters effectively represents the system behavior. Thereafter, the counters are preferably relied upon to effectively represent the system behavior. Accordingly, when defective behavior is encountered during operation of a test program, the counters will preferably be employed to indicate whether this defective behavior is repeatable during subsequent runs of the test program. Use of the counters preferably provides considerable computational economy over the use of clock cycle by clock cycle behavior for the purpose identifying repeatable system conditions including defective behavior.

In a preferred embodiment of the present invention, a single test program may be varied by employing a pseudo-random number seed which varies the values of data, data storage locations accessed, types of access, and program branching decisions within the test program. Successive runs of the test program are preferably continuously varied by employing a new seed for each run of the test program. The inventive mechanism preferably records the seeds employed so as to enable a repetition of a particular sequence of test program runs where circumstances warrant.

In a preferred embodiment, where a discrepancy is detected between emulated and actual test program results, the inventive mechanism will preferably attempt to reproduce the discrepancy to determine whether a persistent defect exists, or whether a transient effect produced the failure. Generally, even a persistent defect may not reappear merely by re-executing the failing run in the sequence since many program runs may have contributed to the initial system state prior to the failing run. Accordingly, the inventive mechanism may select a seed farther back in the history of test program runs as the starting seed to initiate a sequence of further test program runs in order to reproduce the failure.

In a preferred embodiment, where the inventive mechanism identifies a test program associated with a particular seed where a failure occurs repeatedly, further analysis may be conducted to track down the defect causing the failure. A mechanism may be provided so that samples of selected internal system node values may be sampled at selected clock cycles during successive instances of execution of the failing run in order to build a trace of system activity. Such a trace may be very helpful in providing information to track down and correct a system defect.

In a preferred embodiment, the inventive mechanism employs a set of counters measuring a variety of system parameters in order to assess the system behavior during a test program run. The type and number of the system parameters measured by the counters are preferably selected, based on empirical data, to assure that repeatability of counter measurements practically assures repeatability of system behavior. The number and type of system parameters needed to measure system repeatability effectively may vary depending on the test program and on the system configuration. In one exemplary system configuration and test program combination, eight counters were found to be sufficient to measure system repeatability effectively. It will be appreciated that fewer or more than eight counters may be employed where other system configurations and other test programs are employed. The inventive mechanism may be employed to find functional bugs as well electrical bugs. Generally, electrical bugs are apt to be more transient due to exercising metastable behavior and are therefore less repeatable than functional bugs. The inventive mechanism may be employed in systems with inherent probabilistic non-repeatability such as systems containing metastable bus synchronizer between independent clock domains.

In an alternative embodiment of the present invention, the repeatability measurement may be used to determine whether a test program is repeatable. Preferably, the test program is run on a system which has already been found to be reasonably repeatable in order to determine now repeatable the test program is. In this case, the system is being treated as correct, and the program is being tested for repeatability. This approach may be employed to improve the accuracy and reliability of the test program software.

Therefore, it is an advantage of a preferred embodiment of the present invention that system information is condensed into a manageable number of parameters logged in counters to practically measure repeatability of the system behavior.

It is a further advantage of a preferred embodiment of the present invention that repeatability of a failure during a particular test program run may be enabled by re-executing a selected number of test program runs preceding the failing run.

It is a still further advantage of a preferred embodiment of the present invention that the initial state of the system need not be fully recreated in order to achieve repeatability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is given for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
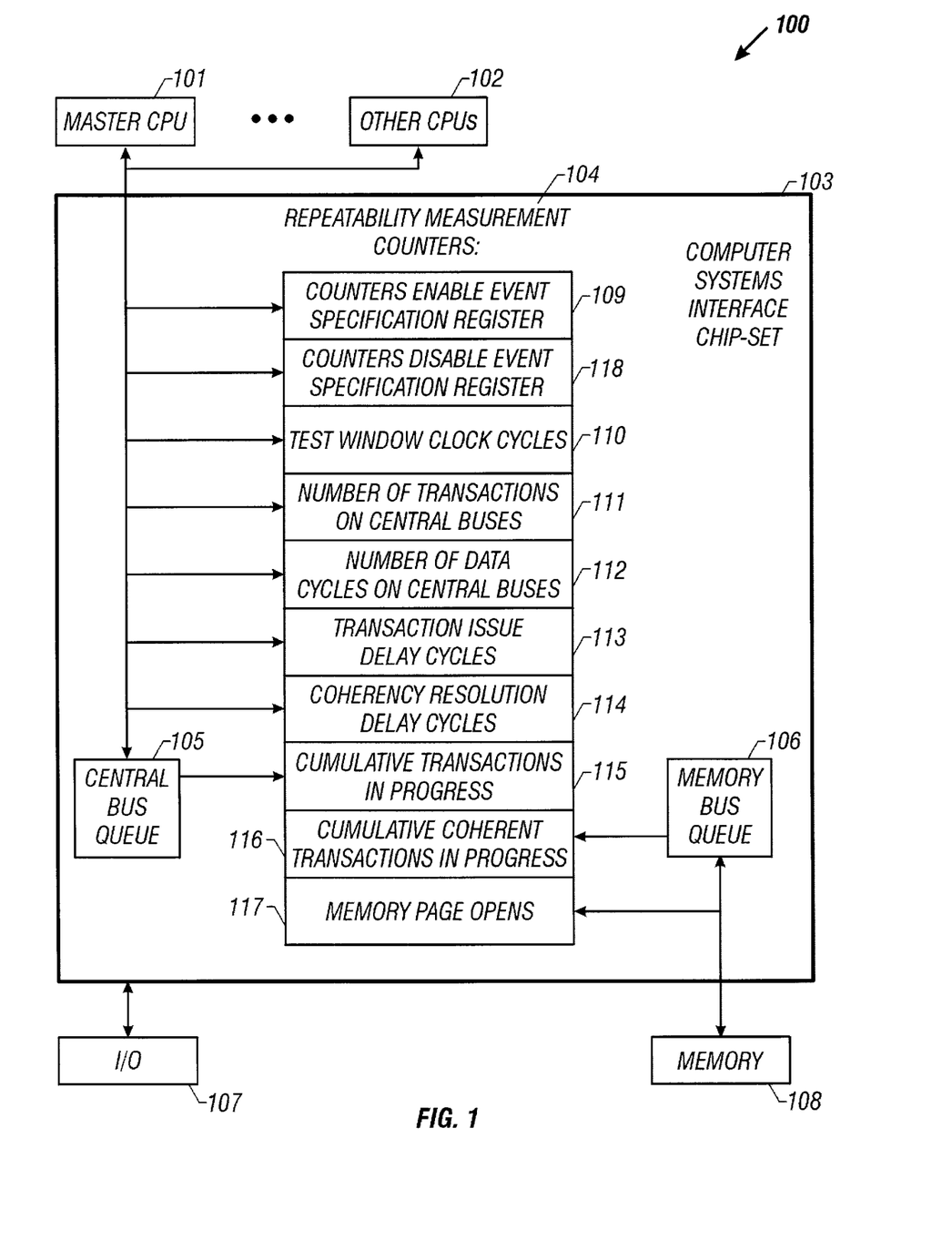
FIG. 1 depicts a computer system which includes an interface chip set having repeatability counters according to a preferred embodiment of the present invention.

FIG. 1 depicts a computer system 100 suitable for testing employing a preferred embodiment of the present invention. Computer system 100 preferably includes a master CPU 101 and plurality of other CPUs 102. Computer system 100 preferably further includes an interface chip set 103 which includes a central bus queue 105 and a memory bus queue 106. Interface chip set 103 preferably communicates with input/output (I/O) devices 107 and memory 108. In the following, reference numeral 104 refers to the repeatability measurement counters as a group which is shown depicting eight counters numbered 110 through 117. It will be appreciated that the invention is not limited to the deployment of eight counters.

In a preferred embodiment, repeatability measurement counters 104 (hereafter "counters") may be incorporated into hardware within computer system 100, or alternatively may be stored in equipment separate from, and in communication with, computer system 100. Counters 104 are preferably able to measure repeatability for both functional and electrical bugs. Where computer system 100 includes a large number of processors and other hardware, the parameters measured by counters 104 preferably measure activity affecting all hardware in system 100 so as to ensure that counters 104 track overall system behavior as closely as possible. In a preferred embodiment, counters 104 are hardware implemented counting devices. However, it will be appreciated that the function of the counters could alternatively be performed in software.

Herein, the term "system state" generally refers to a theoretically exact measurement of a state of system of 100 at a point in execution of system 100, and the term "counter state" generally refers to the state of counters 104 at a point in execution of system 100. "Repeatable system behavior" or "system repeatability" generally refers to repetition of the sequence of system states or system state trajectory upon running the same test program on a given system. Generally, a repeated final counter state practically assures, but does not guarantee, that a system state trajectory has repeated and that there is therefore "system repeatability." A condition in which the final counter state is repeated after successive runs of the same test program is referred to as "counter repeatability." The term "failing test program" generally refers to a test program run which produces a failure condition.

In a preferred embodiment, repeatable system behavior is generally desirable because it helps determine the cause of any failures detected by a test program. If a test program is repeatable, and successive runs of a failing test continue to fail, then a persistent defect is generally indicated, otherwise a transient defect may be indicated. If a test program is repeatable, and the failing test can be reproduced on another similarly configured system, then a class defect is generally indicated, otherwise a point defect may be indicated. Symptoms of a failure may be detected long after an occurrence of the failure. Generally, where there is repeatable system behavior and a repeatable failure, an iterative approach may be used to collect data about the failure. For example, the computer system may contain hardware that allows the values of many signals inside and outside the system components to be sampled during a specified clock cycle. Where there is repeatable system behavior and a repeatable failure, a trace of the values of these many signals over time may be constructed.

In a preferred embodiment, the inventive mechanism condenses information concerning the behavior of system 100 into a manageable set of repeatability measurement counters. Preferably, the measurements are accomplished by counters 104 within the computer system interface chip-set 103. Counters 104 may be enabled 109 by a specified enable event and disabled 118 by a specified disable event. Hardware enable and disable event specification registers are preferably provided. Preferably, a test program can set up the enable and disable events by writing event specifications into hardware event specification registers. One exemplary event specification would be matching a particular transaction on a system bus. Preferably, a timing window between enable and disable events determines a window, or time period, during which repeatable system behavior is measured.

In a preferred embodiment, counters 104 may be initialized and their values read by a test program. Preferably, counters 104 may count occurrences of various conditions. Examples of counter operation include a counter that increments every clock cycle, yielding the number of clock cycles between enable and disable events, a counter which increments by one count for each occurrence of a transaction of a particular type that is issued on one or more system buses, a counter which increments by the number of transactions stalled from making progress for a particular reason every clock cycle, and a counter which increments by the number of entries in a system queue every clock cycle.

In a preferred embodiment, before the timing window test software initializes the counters 104 and sets up enable 109 and disable 118 events, and subsequently the enable 109 event specified preferably occurs, which event is preferably generated by test software. Preferably, during the timing window, each counter among counters 104 counts occurrences of an event, or system function associated with that counter. Preferably, the counting continues until a specified disable 118 event occurs, which disable event is preferably generated by test software. Preferably, once the timing window period is over, final values of counters 104 are read by test software and then employed as a measure of system repeatability.

In a preferred embodiment, in order to practically measure repeatable system behavior, the same counter state should be obtained when the same test program is repeatedly run on system 100 which is exhibiting perfectly repeatable system behavior. However, obtaining the same counter state does not guarantee that system repeatability is perfect. This arises from the fact that counters 104 generally do not measure all possible variations in system behavior during a test program run. However, with counters monitoring several appropriately selected system components such as buses and queues, it becomes less likely that the counter state would be repeatable without system behavior also being repeatable. Preferably, the number of counters required to practically measure repeatable system behavior can be empirically determined and may vary with the test program and the configuration of system 100. In one exemplary case, it was empirically determined that eight counters were adequate for practically measuring repeatable system behavior of one particular computer system.

Generally, a perfect measurement of system behavior and of system repeatability could be determined by measuring the totality of the system state trajectory. However, such a measurement would generally involve a very large number of data values and be extremely time consuming and impractical to obtain. Preferably, judicious selection of the parameters to be measured using counters, and of the total number of counters to be used operates to practically assure accurate measurement of system state trajectory and of system repeatability.

Generally, once the parameters to be measured by counters 104 are selected, and the number of parameters to be tracked by counters 104 identified, in connection with a particular system, the likelihood of falsely identifying two different system state trajectories as equal based on matching counter states, and thus generating a false assertion that a system state trajectory has been repeated generally becomes extremely unlikely. Employing counter repeatability as an indicator of system repeatability thereby generally minimally sacrifices accuracy while greatly improving the measurement efficiency by condensing system state trajectory information into a manageable number of counters. In addition to providing a practical measure of exact repeatability, a distribution of frequency of occurrence versus values observed for each of the individual counters taken over many of the same test program runs yields a useful measure of repeatability when there is not perfect system repeatability.

In the exemplary embodiment of FIG. 1, events which may be counted during a given timing window to help ensure that a repeatable counter state practically assures repeatable system behavior, and counters for preserving such measurements include: 1) the number of clock cycles recorded in counter 110, 2) the number of transactions issued on the central buses recorded in counter 111, 3) the number of data cycles issued on the central buses recorded in counter 112, 4) the number of delay cycles between winning bus arbitration and issuing a transaction on the central buses recorded in counter 113, 5) the number of delay cycles needed to resolve coherency for transactions on the central buses recorded in counter 114, 6) the number of transactions in progress accumulated each clock cycle on the central buses recorded in counter 115, 7) the number of coherent transactions in progress accumulated each clock cycle recorded in counter 116, and 8) the number of memory page open transactions issued to memory storage recorded in counter 117. It will be appreciated that the count for the events listed above may increase by more than one count in a particular sampling operation. For example, in the case of event type 6 above, if five transactions are in progress when a sampling operation for event type 6 is conducted, the value stored in the counter for event type 6 will be incremented by five rather than by one.

It will be appreciated that the present invention is not limited to employing the eight particular measurements listed above. Systems employing fewer or more than eight measurements may be employed and remain within the scope of the present invention. Furthermore, different measurements from those listed above may be employed depending upon the configuration of the system being tested, and all such variations are included within the scope of the present invention.

Figure 2:
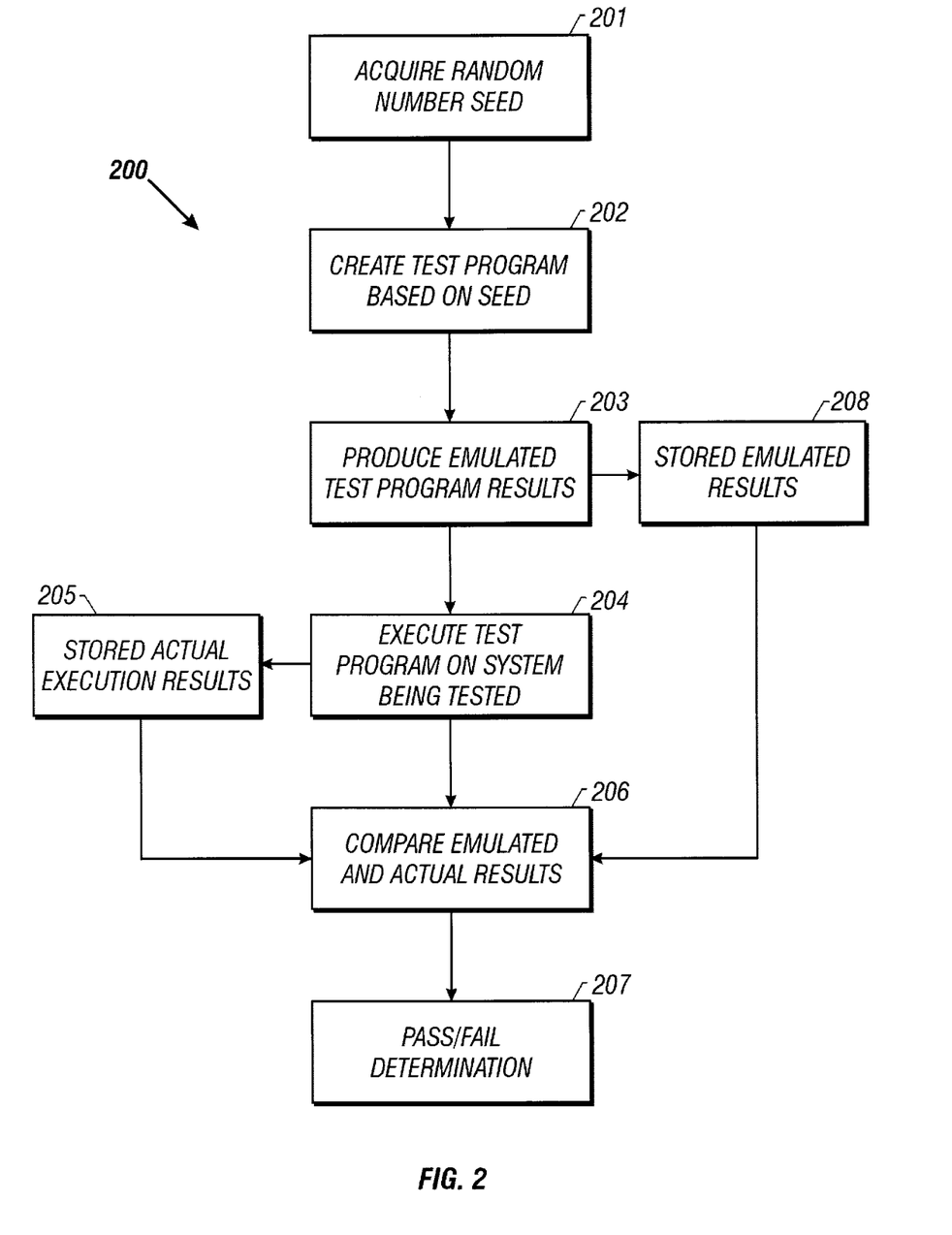
FIG. 2 is a logic flow diagram of a test program run according to a preferred embodiment of the present invention.

FIG. 2 is a logic flow diagram 200 of a test program run according to a preferred embodiment of the present invention. Test programs may run on systems for days at a time employing a succession of seeds (pseudo-randomly generated numbers) to generate substantially unique test program runs. Generally, the value of a seed will be used to determine data values as well as register values, addresses accessed, and types of access by a system being tested in order to ensure that as much of the system hardware as possible is exercised. The value of the seed may be further employed to determine logical branching in the program thereby still further modifying the operation of the test program from one run (instance of execution) to another based on the seed value. In this manner, a single test program employing an effectively infinite number of seeds may be run repeatedly on the system, and exercise the system somewhat differently with each test program run. Preferably, this approach operates to provide an extensive search for failure conditions in the system being tested.

In a preferred embodiment, at step 201, a pseudo-random number seed is acquired for use with a prospective test program run. At step 202, a test program version to be executed for the current program run is preferably generated employing the seed acquired in step 201. The seed is preferably employed to create the test program as described earlier in the discussion of FIG. 2.

In a preferred embodiment, at step 203, the test program produces emulated test program results, which results are a subset of the expected total final system state. The emulated program results are preferably stored 208 for subsequent comparison with actual program results 205. Preferably, the emulated program results include the values present in selected registers and memory locations after emulation of the test program.

In a preferred embodiment, at step 204, the test program created in step 202 is executed on the system being tested. The actual results of the program test on the system are preferably stored as shown in step 205, which results are a subset of the actual total final system state. Preferably, the counters employed to measure repeatable system operation during the execution of the test program in step 204 are initialized at the beginning of the test program. The counters preferably begin counting upon activation of a start trigger or other counters enable event and conclude counting upon activation of a stop trigger or other counters disable event.

At step 206, the emulated results 208 are compared with actual execution results 205 in order to determine a pass or fail status for the system during execution of the instant test program run. Preferably, in order to achieve a pass condition there should be a complete match between the expected final system state subset in the emulated results 204 and the actual final system state subset associated with actual execution results 205. If there is not a complete match in system state, a fail condition preferably results. Applying the above criteria for pass and fail conditions, a pass/fail determination 207 is then preferably made.

Figure 3:
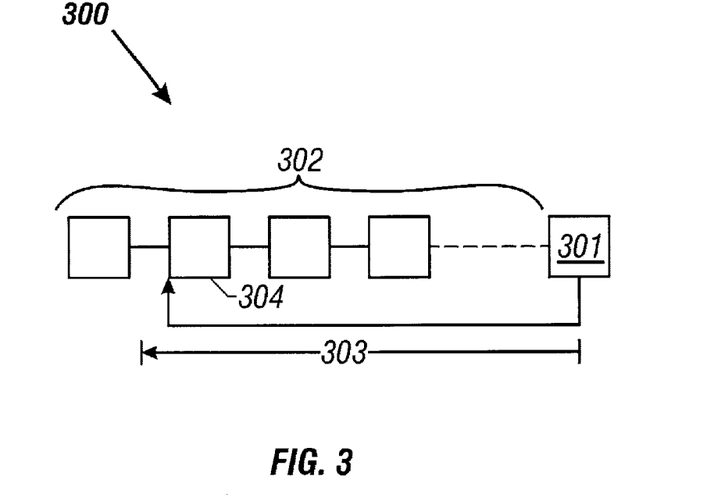
FIG. 3 depicts an example of a sequence of distinctive test program runs on a computer system according to a preferred embodiment of the present invention.

FIG. 3 depicts an example of a sequence of distinctive test program runs 300 with associated seeds on a computer system according to a preferred embodiment of the present invention. Block 301 preferably represents a test program, which after having been run on a computer system generates a failure which is not repeated upon re-executing test program 301.

Preferably, when a failure (as discussed in connection with FIG. 2) is identified at the conclusion of a test program run, the inventive mechanism re-executes the failing test program run or version in order to determine if the failure is repeatable. If the error is repeatable, the inventive mechanism may perform more detailed analysis on the system at selected clock cycles within the program run in order to track down the defect causing the failure in the system being tested. However, on occasion, a failure condition results upon executing a particular test program run 301 occurring after a succession of distinctive preceding test program runs 302 which is not repeated upon re-executing the failing test program run 301. Such a condition may result where the failing condition results from a combination of initial system conditions preceding test program 301 and the execution of test program run 301 and which may not occur if test program 301 is executed when the system starts from a different set of initial conditions. In this situation, an non-repeatable failure condition results.

In a preferred embodiment, in order to cause the failing condition in program run 301 to repeat, the inventive mechanism may initiate execution at a selected point in a sequence of test program runs preceding program run 301, where the preceding sequence is indicated by reference numeral 302. As previously discussed, a long sequence of distinctive test program runs may be generated by modifying an initial test program according a sequence of pseudo-random number seeds such that each test program in sequence 300 is unique within the sequence and preferably affects the system under test distinctively.

In a preferred embodiment, reference numeral 303 represents a number of program runs within sequence 302 preceding program run 301 which the inventive mechanism may re-execute in order to cause a failing condition in program 301 to repeat. Reference numeral 304 points to the first program run in the history of program runs 302 preceding program run 301 at which execution will resume once the inventive mechanism has elected to move back a number of program runs corresponding to reference numeral 303. Herein, the number of program runs 303 by which the inventive mechanism retreats in order to restart execution to achieve failure repeatability is referred to as re-execution length 303. While re-execution length 303 may include any number of program runs, generally a length of fifty program runs is sufficient to cause a functional error to repeat for one particular test program.

Figure 4:
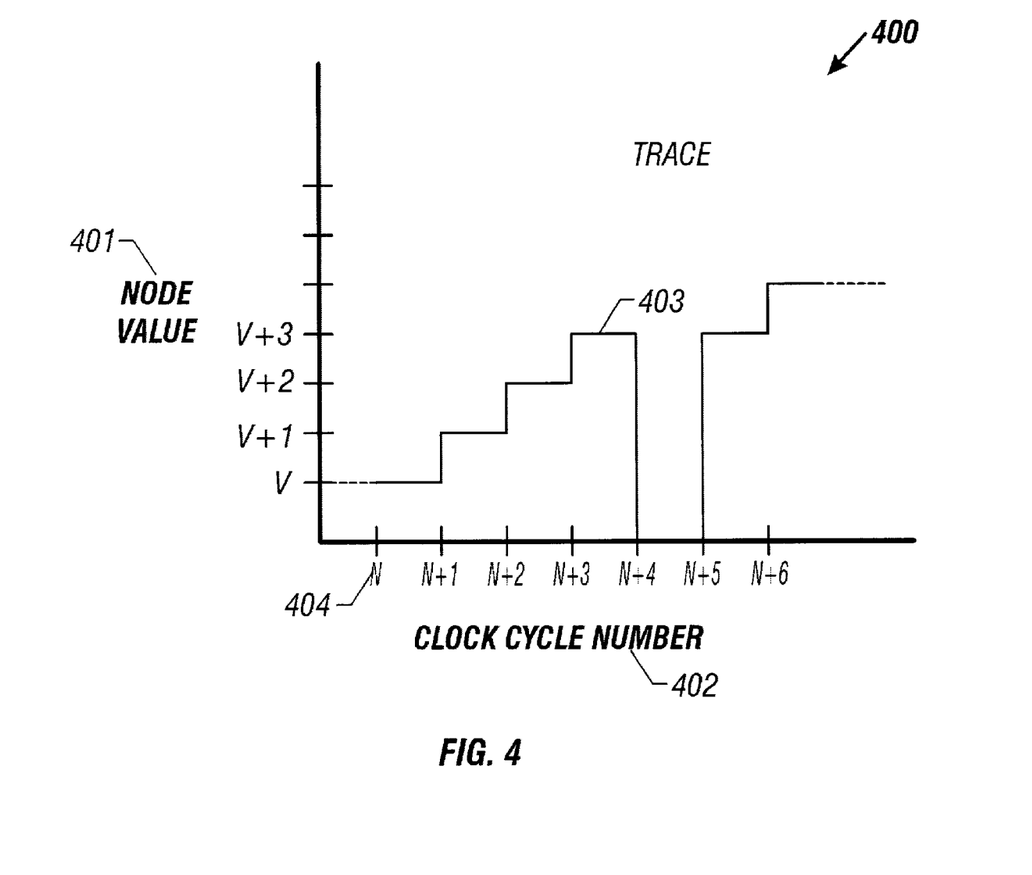
FIG. 4 depicts an exemplary value of a trace of an internal system node according to a preferred embodiment of the present invention.

FIG. 4 depicts an exemplary value of a trace 403 of an internal system node according to a preferred embodiment of the present invention. In the example of FIG. 4, node value 401 is shown plotted against clock cycle number 402. Node value 401 may be selected from any one of a number of internal nodes of a system under test. In a preferred embodiment, once a test program run has been found which produces a repeatable failure condition (a failing test program), it is generally desirable to examine the status of system nodes during the execution of this failing test program.

In a preferred embodiment, information may be gathered representing the status of one or more internal nodes of a system by sampling the value of selected nodes at particular clock cycles during successive runs of the failing test program. One approach to selecting clock cycles at which to sample node values is to establish a trigger which activates sampling of selected nodes at a pre-selected clock cycle number, such as, for instance, after the counters enable trigger, for a first run of the failing test program. Thereafter, the inventive mechanism may operate to successively re-execute the same failing test program and sample selected nodes in the system at successive clock cycles. For example, during a first run, nodes may be sampled at clock cycle 10,000. During the second run, nodes are sampled at clock cycle 10,001, and so forth. If the system or failure is only occasionally repeatable, then many samples can be taken and rejected until a sample is taken for a repeatable failure. This process may be repeated until an entire execution time region of interest to a debugging process has been throughly sampled. The data resulting for each node sampled as described above is generally referred to as a "trace."

In a preferred embodiment, for computer systems which include a substantial number of different chips, sampling is preferably conducted on nodes selected from locations throughout the computer system, thereby providing information on the status of all chips in the system during execution of the failing test program. Acquisition and storage of the sampling data is preferably performed by hardware and software which is independent of the computer system being tested. Alternatively, however, the data sampling may be conducted by selected portions of the system under test. It will further be appreciated that the selection of clock cycles at which to sample node values need not be determined by adding one cycle to the cycle sampled on in the previous run of the test program, but may be determined by a range of possible arithmetic operations.

An illustrative example of an application of the above sampling technique is demonstrated in FIG. 4. A single node value 401 is plotted against clock cycle number 402 for a selected range of clock cycles. Trace 403 is preferably the result of plotting the sampled node values 401 against the various clock cycles 402. Where a clock cycle range is well chosen within a failing test program, trace 403 may be of value to a system debugging process. The sampling is shown beginning at clock cycle number N 404, where N may be any clock cycle number within the failing test program. The other clock cycle numbers in FIG. 4 are numbered only with respect to N 404.

Continuing with the example, it may be seen that samples are shown for clock cycle numbers N through N+6. It will be appreciated that the sampling range depicted is for purposes of illustration only and that the sampling range could be extended to include thousands of cycles within the failing test program. In the example, it is presumed that node value 401 is expected to increment by a value of 1 for each advancing clock cycle. It may be seen that this pattern is maintained between clock cycle values N 404 and N+3. However, at clock cycle N+4, node value 401 drops to a value of 0. Such information would presumably be of value to a debugging process which would be expecting a different value.

In a preferred embodiment, it may be seen that errors in a system under test may be identified and scrutinized in multiple steps. First, a test program is preferably repeatedly executed employing a succession of different randomly generated seeds in order to fully exercise the system under test and discover any defects present in the system. Once a test program employing a particular seed causes a failure condition in a repeatable manner, operation of the system during execution of this "failing test program" may be further scrutinized by collecting traces of internal node values of the system under test to provide valuable debugging information.

Figure 5:
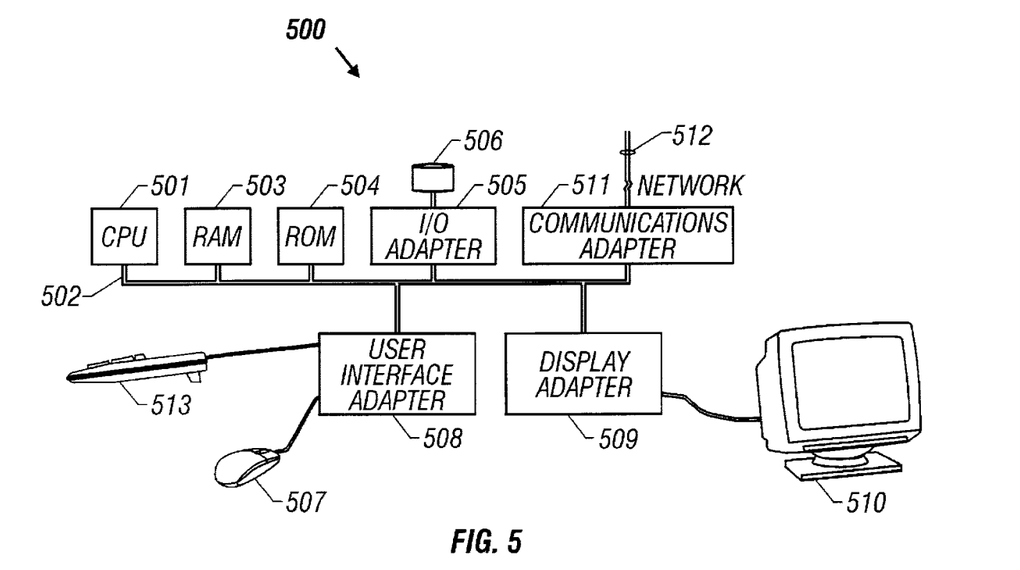
FIG. 5 illustrates computer system adaptable for use with a preferred embodiment of the present invention.

FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

The bus 502 is also coupled to input/output (I/O) adapter 505, communications adapter card 511, user interface adapter 508, and display adapter 509. The I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. The display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for practically measuring repeatable behavior of a computer system, the method comprising the steps of:

selecting a plurality of events to be monitored during execution of a test program in order to represent a state trajectory of said system;

counting occurrences of said plurality of events in a plurality of counters during execution of a test program, wherein each counter counts occurrences of one event of said plurality of events;

determining a counter state at a conclusion of execution of said test program, wherein said counter state includes a count value for each counter of said plurality of counters, and wherein said selecting step is performed such that repeatability of said counter state upon re-execution of said test program practically measures repeatability of a system state trajectory.

2. The method of claim 1 wherein said step of counting occurrences comprises the step of:

counting a number of clock cycles occurring during a run of said test program.

3. The method of claim 2 wherein said step of counting occurrences further comprises the step of:

counting a number of transactions issued on central buses of said computer system.

4. The method of claim 1 further comprising the steps of:

initiating operation of at least one counter of said plurality of counters upon occurrence of a counter enable event; and halting operation of said at least one counter upon occurrence of a counter disable event.

5. The method of claim 1 further comprising the steps of:

generating a sequence of random number seeds;

generating a sequence of varying test program runs based on said sequence of seeds; and executing said sequence of varying test program runs on said computer system.

6. The method of claim 5 further comprising the step of:

generating one of a pass condition and a failure condition each time a test program run in said sequence of test program runs is executed, wherein a test program run which generates said failure condition is a failing test program run.

7. The method of claim 6 further comprising the step of:

upon generating said failure condition during execution of said failing test program run, re-executing said failing test program run to determine whether said failure condition can be repeated.

8. The method of claim 7 further comprising the step of:

where said failure condition is substantially repeatable, producing a trace of at least one internal node of said computer system.

9. A system for practically measuring repeatable behavior of a computer system, the system comprising:

means for selecting a plurality of events to be monitored during execution of a test program in order to represent a state trajectory of said system;

means for counting occurrences of said plurality of events in a plurality of counters during execution of a test program, wherein each counter counts occurrences of one event of said plurality of events;

means for determining a counter state at a conclusion of execution of said test program, wherein said counter state includes a count value for each counter of said plurality of counters, and wherein said selecting step is performed such that repeatability of said counter state upon re-execution of said test program practically assures repeatability of a system state trajectory.

10. The system of claim 9 wherein said step of counting occurrences comprises:

means for counting a number of clock cycles occurring during a run of said test program.

11. The system of claim 10 wherein said step of counting occurrences further comprises:

means for counting a number of transactions issued on central buses of said computer system.

12. The system of claim 11 further comprising:

means for initiating operation of at least one counter of said plurality of counters upon occurrence of a counter enable event; and halting operation of said at least one counter upon occurrence of a counter disable event.

13. The system of claim 9 further comprising:

means for generating a sequence of random number seeds;

means for generating a sequence of varying test program runs based on said sequence of seeds; and means for executing said sequence of varying test program runs on said computer system.

14. The system of claim 13 further comprising:

means for generating one of a pass condition and a failure condition each time a test program run in said sequence of test program runs is executed, wherein a test program run which generates said failure condition is a failing test program run.

15. The system of claim 14 further comprising:

means for re-executing said failing test program run to determine whether said failure condition can be repeated.

16. The system of claim 15 further comprising:

means for producing a trace of at least one internal node of said computer system where said failure condition is substantially repeatable.

17. A method for measuring behavior of a computer system, the method comprising the steps of:

establishing at least one event for measuring system behavior;

counting occurrences of said at least one event in said computer system during a current run of a test program, thereby generating an actual counter state at a conclusion of execution of said current run of said test program;

selecting an expected counter state from a counter state resulting from a prior run of said test program;

comparing said expected counter state with said actual counter state; and establishing one of a repeatable condition and a non-repeatable condition for said current run of said test program based on a result of said step of comparing.

18. The method of claim 17 comprising the further step of:

generating said test program employing a random number seed.

19. The method of claim 17 comprising the further step of:

upon establishing a failing condition for said current test program run, re-executing said test program to determine whether said failing condition is repeatable.

20. The method of claim 19 comprising the further step of:

where said failing condition is repeatable, conducting a trace of at least one internal node of said computer system.

* * * * *